March 6, 1934.  R. S. JOSLIN  1,949,836
PRESERVING RECEPTACLE
Filed Oct. 8, 1932  3 Sheets-Sheet 1

Inventor
R. S. Joslin
By Clarence A. O'Brien
Attorney

March 6, 1934. R. S. JOSLIN 1,949,836
PRESERVING RECEPTACLE
Filed Oct. 8, 1932 3 Sheets-Sheet 2
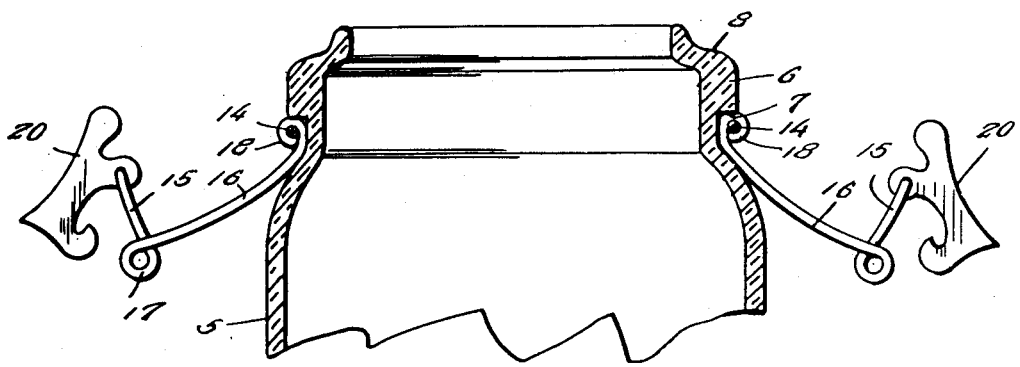
Fig. 3.
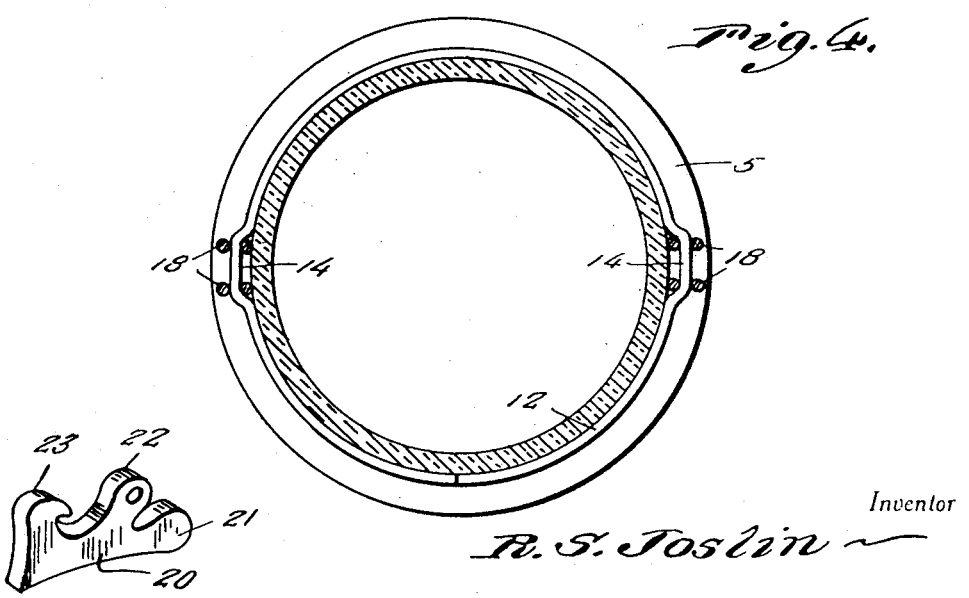
Fig. 4.
Fig. 8.
Inventor
R. S. Joslin
By Clarence A. O'Brien
Attorney March 6, 1934. R. S. JOSLIN 1,949,836
PRESERVING RECEPTACLE
Filed Oct. 8, 1932 3 Sheets-Sheet 3
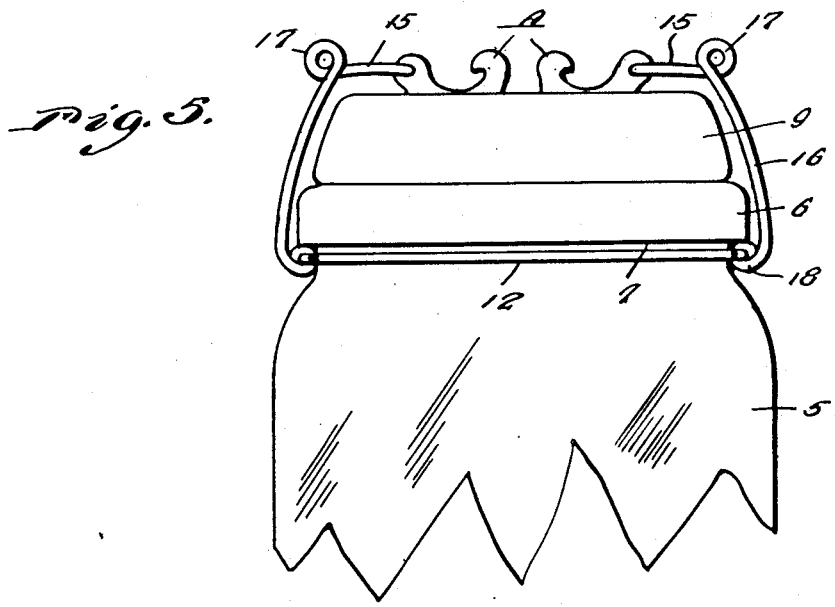
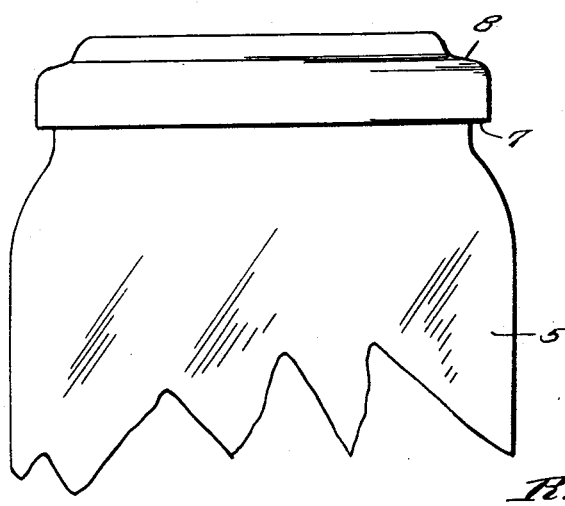
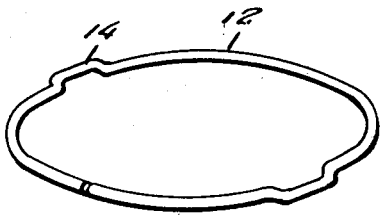
Inventor
R. S. Joslin
By Clarence A. O'Brien
Attorney Patented Mar. 6, 1934

1,949,836

UNITED STATES PATENT OFFICE 1,949,836

PRESERVING RECEPTACLE

Robert S. Joslin, East Detroit, Mich.

Application October 8, 1932, Serial No. 636,904

1 Claim. (Cl. 215—87)

The present invention relates to a preserving receptacle and the like and has for its prime object to provide a receptacle having closure means adapted to be quickly and conveniently closed airtight and open to expose the contents of the receptacle when desired.

Another important object of the invention resides in the provision of fastening means for the closure of a receptacle such as a fruit jar or the like, said means being simple in its construction, strong and durable, thoroughly efficient and reliable in use and operation and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 3 is a fragmentary vertical section through the jar showing the parts disassembled, Figure 4 is a horizontal section taken on the line 4—4 of Figure 1.

Figure 5 is a side elevation of a receptacle, the bottom portion being broken away showing the fastening means holding the lid in place.

Figure 6 is a detail side elevation of the upper portion of the receptacle,

Figure 7 is a perspective view of the ring, and

Figure 8 is a perspective view of one of the shoes.

Figure 1:
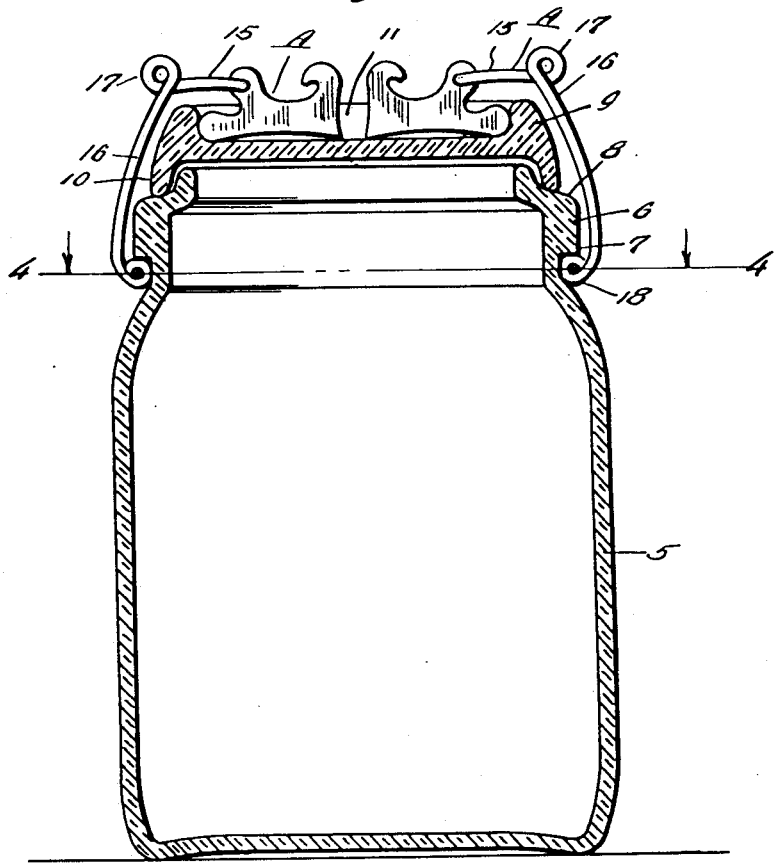
Figure 1 is a vertical section through a fruit jar or the like showing the fastening means holding the lid in place.
Figure 2:
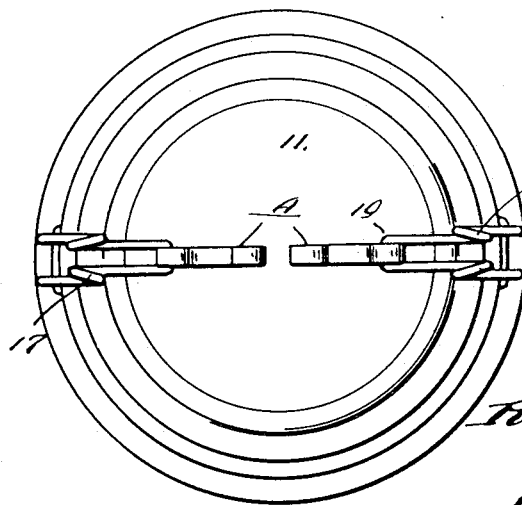
Figure 2 is a top plan view thereof.

Referring to the drawings in detail it will be seen that the numeral 5 denotes a fruit jar or any other suitable receptacle formed with a neck 6 having an annular shoulder 7 at its bottom and an annular seat 8 at its top for reception of a lid 9 having on its bottom an annular skirt 10 to rest on the seat 8 and having its top recessed as indicated at 11. The numeral 12 denotes a ring disposed about the neck 6 under the shoulder 7 and having at diametrically opposed points outwardly offset portions 14. Letters A denote two arms each formed from a single strand of resilient wire or the like bent over upon themselves so as to provide two sections of general L-shaped formation, each section comprising a relatively short arm 15 and a relatively long arm 16, the two arms being connected by a convolute 17. The arms 15 and 16 are slightly curved. The arm 16 terminates in an eye 18 rockable on the portion 14. The arms 15 merge into bites or connections 19 between the sections. Numerals 20 denote oblong shoes having at one end heads 21 the outer edges of which are curved for engagement within the recess 11 as shown in Figure 1 with the spring arms A under tension. Lugs 22 project laterally from the shoes 20 adjacent the heads 21 and are apertured to receive the bites 19. Hook lugs 23 also project from the shoes 20 at the end remote from the head 21 so that implements may be engaged therewith for rocking the shoes upwardly out of the recess 11 for releasing them whenever it is desired to remove the cover or lid 9. After the shoes have been released, the arms A are swung out of the way as shown in Figure 3. In placing the lid on the neck, the arms A are swung upwardly and the heads engaged in the sides of the recess 11 and then the free ends pushed downwardly thus placing the arms under tension and locking the lid securely in place to prevent leakage.

It is thought that the construction, operation, utility and advantages of this invention will now be clearly understood without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination with a receptacle having a neck formed with an annular groove, a ring located in the groove, a pair of oppositely arranged substantially L-shaped spring arms, each having one end pivoted to the ring, a plate-like shoe pivoted to the opposite end of each arm, a lid having a recess in its top, the side wall of which is slightly curved inwardly where the side wall merges with the bottom of the recess to form a concavity, each shoe having an ear intermediate its ends extending upwardly from the upper edge of the plate-like shoe and to which ear the arm is pivoted, the lower edge of the shoe being bowed upwardly and one end of the shoe being reduced and rounded to fit in a part of the concavity, the other end of the shoe forming a point where said end merges with the upwardly bowed part, said point resting upon the bottom wall of the recess and said end of the shoe having a hook portion extending upwardly from its upper edge.

ROBERT S. JOSLIN.